(12) United States Patent
Watanabe

(10) Patent No.: US 8,584,649 B2
(45) Date of Patent: Nov. 19, 2013

(54) ENGINE CONTROL APPARATUS

(75) Inventor: Shinji Watanabe, Chiyoda-ku (JP)

(73) Assignee: Mitsubishi Electric Corporation, Tokyo (JP)

(*) Notice: Subject to any disclaimer, the term of this patent is extended or adjusted under 35 U.S.C. 154(b) by 279 days.

(21) Appl. No.: 13/179,238

(22) Filed: Jul. 8, 2011

(65) Prior Publication Data

US 2012/0197509 A1 Aug. 2, 2012

(30) Foreign Application Priority Data

Feb. 1, 2011 (JP) .................................. 2011-019686

(51) Int. Cl.
*F02D 41/08* (2006.01)

(52) U.S. Cl.
USPC ....... 123/399; 123/361; 123/339.14; 701/110

(58) Field of Classification Search
USPC .......... 701/102, 103, 110, 112, 113; 123/399, 123/339.14, 339.19, 339.22, 339.24, 179.4, 123/179.16, 179.18, 361
See application file for complete search history.

(56) References Cited

U.S. PATENT DOCUMENTS

| 4,985,837 A * | 1/1991 | Togai et al. .................. 701/85 |
| 6,837,217 B1 | 1/2005 | Hoshino et al. |
| 2005/0092295 A1 | 5/2005 | Hoshino et al. |

FOREIGN PATENT DOCUMENTS

| JP | 10-047135 A | 2/1998 |
| JP | 2001-159321 A | 6/2001 |
| JP | 2007-270792 A | 10/2007 |
| JP | 2009-127550 A | 6/2009 |
| JP | 2012-159045 * | 8/2012 |
| WO | 01-07768 A1 | 2/2001 |

* cited by examiner

*Primary Examiner* — Hai Huynh
(74) *Attorney, Agent, or Firm* — Sughrue Mion, PLLC

(57) ABSTRACT

An engine control apparatus includes an ISS control unit provided with an ISS determination unit for inputting at least an engine cooling water temperature, vehicle speed, and brake information, and target opening setting unit for setting a target opening in an idle stop/start control period. A throttle control unit is provided with a proportional gain correction coefficient operator for correcting a proportional gain to a value that is larger than a proportional gain outside the idle stop/start control period, a throttle opening feedback controller for performing throttle opening feedback control based on an opening deviation between a target opening and an actual opening, and a PWM driver outputting a voltage proportional to the operation amount, to a motor.

2 Claims, 8 Drawing Sheets

FIG.2

| KPMAP | KP(1) | KP(2) | ---- | KP(i-1) | KP(i) |
|---|---|---|---|---|---|
| KIMAP | KI(1) | KI(2) | ---- | KI(i-1) | KI(i) |
| KDMAP | KD(1) | KD(2) | ---- | KD(i-1) | KD(i) |
| ERRTBL | ERROR(1) | ERROR(2) | ---- | ERROR(i-1) | ERROR(i) |

KPMAP: PROPORTIONAL GAIN
KIMAP: INTEGRAL GAIN
KDMAP: DIFFERENTIAL GAIN
ERRTBL: OPENING DEVIATION (ACTUAL THROTTLE VALVE
 OPENING − TARGET OPENING) MAP AXIS

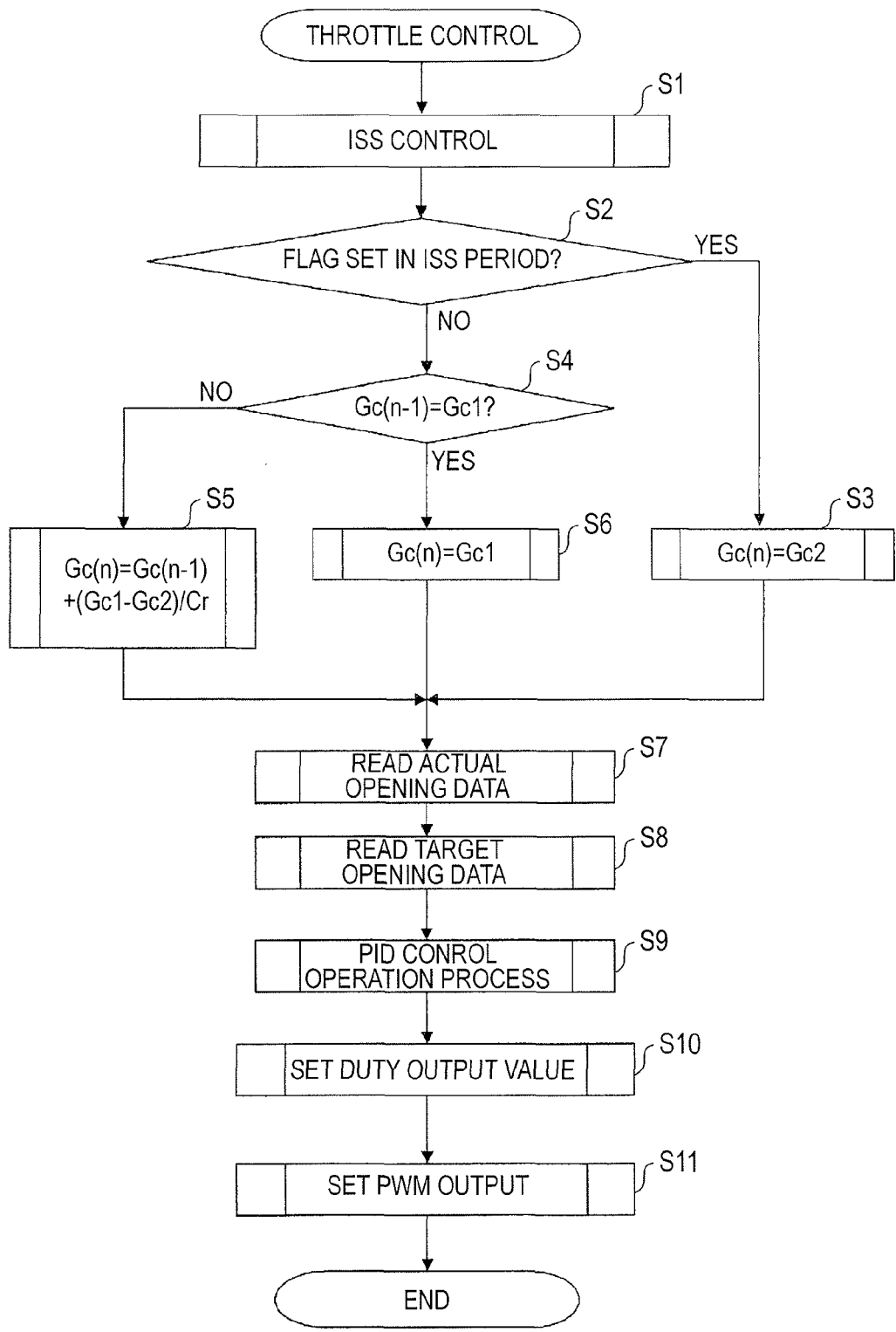

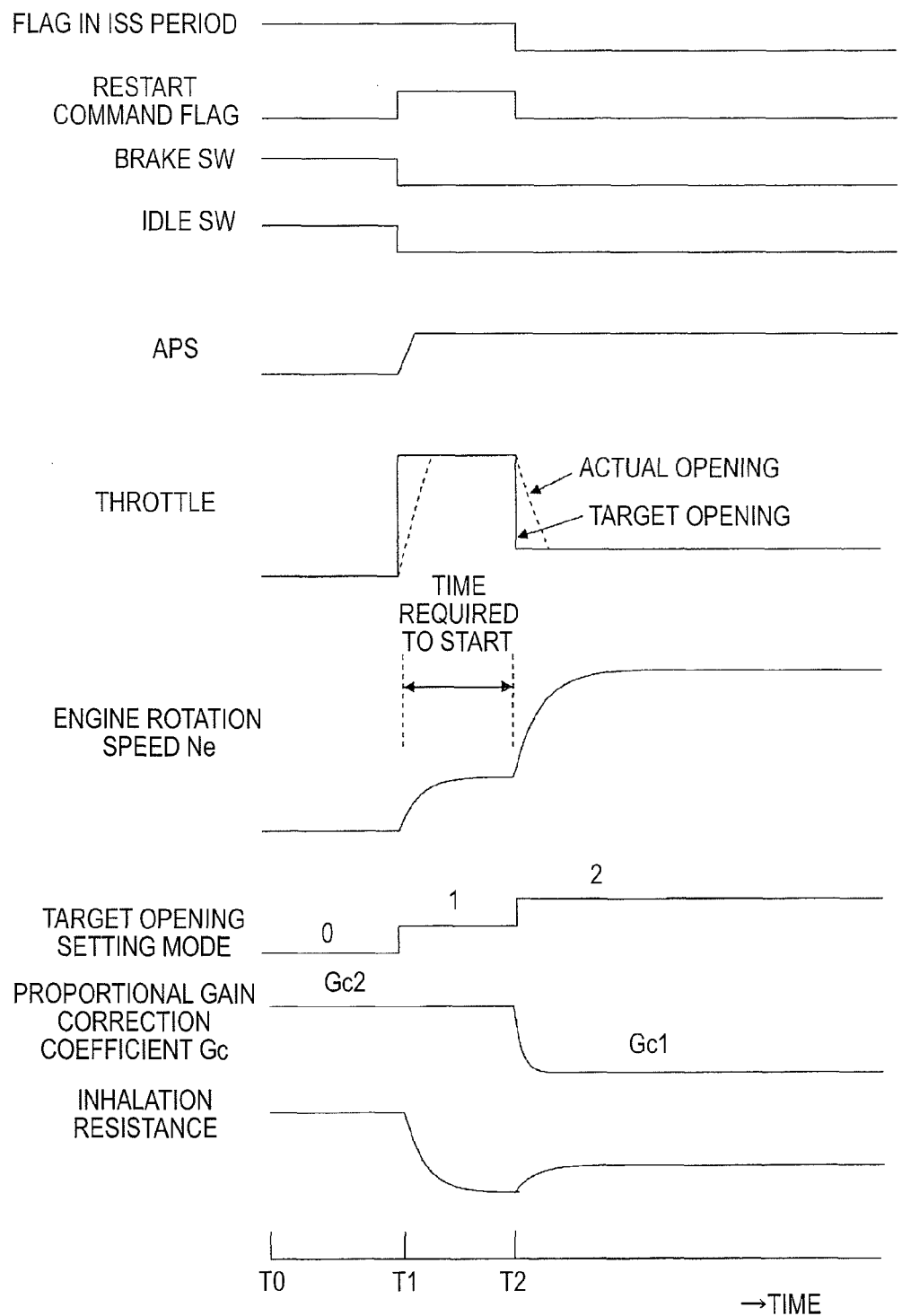

ENGINE CONTROL APPARATUS

BACKGROUND OF THE INVENTION

1. Field of the Invention

The present invention relates to an engine control apparatus which quickly performs a throttle response operation in an engine idle stop/start (hereinafter also called an "ISS") period and shortens an engine restart time.

2. Background Art

In the related art, there is known a technology that shortens a start time by increasing a driving torque of a starter motor in order to shorten a restart time of an idle stop vehicle engine or by setting a throttle opening during restart of an engine to an opening side rather than a throttle opening during a typical idle operation in order to reduce inhalation resistance (pumping loss) caused by a throttle valve installed in an intake pipe.

For example, an engine intake control device disclosed in Patent Document 1 is so configured that the throttle opening during engine start is set to a first opening which is larger than the throttle opening during an idle operation to start cranking, and after finishing a first compression process, the throttle opening is set to a second opening that is smaller than the first throttle opening to perform cranking.

According to the device in the related art disclosed in Patent Document 1, the inhalation resistance during the engine start is set to be decreased to reduce a first climbing torque, and the compression resistance in a cylinder in a compression process is set to be decreased to reduce an average cranking torque, so that the starter motor or a battery can be miniaturized.

Also, an engine control device for a vehicle disclosed in Patent Document 2 is so configured that, in a vehicle engine having an electronic control throttle system that opens/closes a throttle valve with an electric actuator so that the throttle valve has a target opening according to an operation condition of the engine and an idle stop/restart system that compulsorily stops the idle operation of the engine when the vehicle is stopped and makes the vehicle start by restarting the engine through driving of a motor with an accelerator operation after the stop, the electronic control throttle system is configured to control the opening of the throttle valve by driving a lever connected to a valve shaft of the throttle valve by the electric actuator. Meanwhile, the electronic control throttle system includes opening setting means at restart, which connects two springs to both sides of the lever and sets the opening position of the throttle valve during power off of the electronic control throttle system to the opening for supplying air flow that is required to restart the engine to the engine in a position in which the urging of the two springs is balanced, and power shutoff means for turning off the power of the electronic control throttle system after the lapse of a set time by gradually reducing the opening of the throttle valve after the compulsory stop of the engine.

According to the device in the related art disclosed in Patent Document 2, the power of the electronic control throttle system is turned off to set the opening of the throttle valve to the opening that is required to mechanically restart the engine after the lapse of the set time after the idle operation is compulsorily stopped at the vehicle stop, fuel injection restarts together with the cranking through driving of the motor to restart the engine if a restart condition is satisfied through accelerator operation, and control is performed to make the opening of the throttle valve after complete expansion gradually close to the target opening according to the accelerator operation. Accordingly, over-discharge of a battery in an engine stop state is prevented, and the fuel efficiency is improved.

Also, a throttle control device of an internal-combustion engine disclosed in Patent Document 3 is configured to change control gains according to an operation state of a throttle valve, so that variation of throttle opening that occurs just after the change of the control gains is suppressed to constantly maintain a stable operation of the internal-combustion engine.

According to the device in the related art disclosed in Patent Document 3, in a device for feedback-controlling a DC motor for opening/closing a valve so that deviation between a sensor value that is an actual opening of the throttle valve and a command value that is a target opening becomes "0", if the deviation is within a predetermined range (±2°), a normal state is determined, while if not, a transient state is determined, and the control gains (proportional gain Kp and an integral gain Ki) to be used for the respective states are changed, so that responsiveness and stability for control are both established. Also, in the case where the normal state is determined, the control gains are gradually changed to prevent the throttle opening from overshooting from the command value, whereas in the case where the transient state is determined, the control gains are rapidly changed to secure the responsiveness in the transient state.

Patent Document 1: JP-A-2009-127550
Patent Document 2: Japanese Patent No. 3978959
Patent Document 3: JP-A-10-47135

In the case of restarting the engine in the idle stop/start period by using the engine intake control device in the related art disclosed in Patent Document 1, the throttle opening during the engine restart is set to the first opening which is larger than the throttle opening during the idle operation as the target opening value, and an operation amount that is output to the throttle actuator by the throttle opening feedback control operation is calculated. In this case, even if the operation state of the engine is changed, the operation amount (supply voltage to the motor) of the throttle actuator is the same. However, if the temperature of the motor coil is high in comparison to the low temperature state, the resistance value of the motor coil becomes large, and thus the current value that flows through the motor becomes small to lower the motor driving torque. Because of this, the delay of the throttle operation response to the position of the first opening that is larger than the throttle opening during the idle operation becomes large, and thus the time for reaching the opening position, in which the inhalation resistance (the pumping loss becomes small in reverse proportion to the throttle opening value) is lowered by the delay of the throttle operation response, is lengthened. Accordingly, the inhalation resistance reduction effect is not rapidly obtained, and the engine restart time is lengthened (a period from time T1 to time T3 in FIG. 7 to be described later).

Also, in the case of performing the engine restart in the idle stop/start period, a method of waiting for the start while maintaining in advance the throttle valve in a completely open position, in which the inhalation resistance (pumping loss) is low in a period before the engine restarts, may be considered. However, in the case of using the engine control device in the related art disclosed in Patent Document 2, the power of the electronic control throttle system is turned off in the idle stop period, and the throttle valve is maintained in an intermediate opening position in which the throttle valve is mechanically fixed by the urging of the two springs. Because of this, the engine restart is performed by the opening feedback control of the throttle valve from the intermediate opening position to the completely open position in which the inhalation resistance (pumping loss) is low. However, since the resistance value of the motor coil becomes large in the case where the temperature of the motor coil is high in comparison to the low temperature state as described above, the current value that flows through the motor becomes small to lower the motor driving torque, and the time for reaching the completely open throttle position, in which the inhalation resistance is low due to the throttle operation response delay, is lengthened, so that the inhalation resistance reduction effect is not rapidly obtained, and the engine restart time is lengthened.

Further, in the case of performing the engine restart in the idle stop/start (ISS) period by using the throttle control device of the internal-combustion engine in the related art disclosed in Patent Document 3, the throttle opening state before the restart command is the state where the actual opening usually coincides with the target opening within the predetermined opening deviation range (±2°), and the control gain has been changed to the proportional gain in the normal state. If the throttle target opening is set to the throttle opening position in which the inhalation resistance (pumping loss) is low by the restart command, the opening deviation is out of the predetermined range (±2°), and the control gain is changed to the proportional gain in the transient state (the proportional gain value that is larger than the proportional gain value in the normal state according to a third aspect of the invention). However, in the case where the proportional gain in the transient state is set to be large with respect to the proportional gain in the normal state in order to achieve a rapid throttle opening operation response during the engine restart in a throttle actuator operation state in which the ISS is performed after the engine warm-up and it is difficult to achieve the motor current flow (it is difficult to achieve a high motor torque) in a state in which the motor coil has a high temperature, overshoot or undershoot is easily generated when the actual opening converges to the target opening in the throttle actuator operation state in which the motor current flows easily (the motor torque is easily increased) in a state in which the motor coil has a low temperature such as engine start at low temperature.

Accordingly, since there is a possibility that a throttle opening hunting occurs as the opening deviation is varied in the neighborhood of the predetermined range (±2°) and the proportional gain is changed from the proportional gain in the transient state to the proportional gain in the normal state and then to the proportional gain in the transient state, it is difficult to set the proportional gain value in the transient state to be larger than the proportional gain value in the normal state in consideration of the stability of the opening control, and it is usual to adapt the proportional gain so that the stability and responsiveness of the throttle opening control are both established within the operation temperature range of the throttle actuator.

Because of this, in the throttle actuator operation state in which it is difficult to make the motor current flow (it is difficult to achieve a high motor torque) in the high temperature state of the motor coil, such as the ISS execution, the gain marginal value of the proportional gain value that is set with respect to the proportional gain value at which the throttle opening hunting occurs is excessively set. Accordingly, in the operation state in which the motor coil temperature becomes high such as the ISS execution, the resistance value of the motor coil becomes large to make the motor current flow difficult, and thus the motor torque is lowered. Accordingly, the delay of the throttle operation response occurs to lengthen the time for reaching the completely open throttle position, in which the inhalation resistance is low, and thus the inhalation resistance reduction effect is not rapidly obtained to lengthen the engine restart time.

As described above, if the motor temperature is changed due to the engine operation state and the resistance value of the motor coil is changed in the case where the proportional gain is fixed with respect to the operation temperature of the throttle actuator, the motor current value is not the same even if the motor control voltage value is the same. Because of this, when the same opening deviation (=the target opening−the actual opening) occurs, although the control duty value and the motor control voltage value, which are calculated by the PID control operation, are controlled to be the same value, the motor current value is changed due to the change of the resistance value of the motor coil that is caused by the motor temperature, and thus the motor driving torque that is in proportion to the motor current is not controlled to be the same value. That is, the motor driving torque that is controlled and output when the same opening deviation occurs becomes high at low temperature and becomes low at high temperature.

Accordingly, since the gain of the motor control system is heightened as the temperature is lowered, it is usual to adapt the control gain so that the control hunting does not occur at low temperature. In this case, as illustrated in FIGS. 4A and 4B, since the gain of the motor control system is deteriorated due to the increase of the motor coil resistance value in a high-temperature operation state, the torque that is required to drive the throttle valve is not output straightly, and the actual opening response is delayed (see FIG. 4A). Also, if the control gain is adapted to obtain the rapid valve driving at high temperature, the gain becomes excessive at low temperature and thus the hunting of the actual opening occurs (see FIG. 4B). Because of this, it is usually required to adapt the PID control gain so as to avoid the opening hunting at low temperature while sacrificing the opening responsiveness during the high-temperature operation. At this time, as illustrated in FIG. 4, L denotes a target value, M denotes a control amount response at low temperature, and N denotes a control amount response at high temperature.

SUMMARY OF THE INVENTION

The invention has been made in view of the above problems, and an object of the invention is to provide an engine control apparatus which can shorten the engine restart time and miniaturize a starter motor by making a proportional gain value for controlling throttle opening feedback in the ISS period become larger than a proportional gain value outside an ISS period, making a throttle operation response delay during the engine restart small, and rapidly setting a throttle opening to a throttle opening position in which a pumping loss during engine cranking is small.

In an exemplary embodiment of the invention, there is provided an engine control apparatus which includes a throttle actuator driving opening/closing of a throttle valve; throttle opening detection means for detecting an actual opening of the throttle valve; and control means for controlling feedback of the throttle actuator by using a predetermined control gain so that the actual opening of the throttle valve that is detected by the throttle opening detection means becomes a target opening, wherein the control means includes an idle stop/start control unit provided with idle stop/start determination means for inputting at least an engine cooling water temperature, vehicle speed, and brake information and determining the execution of idle stop/start, and target opening setting means for setting a target opening in an idle stop/start control period; and a throttle control unit provided with proportional gain correction coefficient operation means for correcting a proportional gain that is used in a throttle opening feedback control operation to a value that is larger than a proportional gain outside the idle stop/start control period in an engine idle stop/start control period that is determined by the idle stop/start determination means, throttle opening feedback control means for performing a throttle opening feedback control operation based on an opening deviation between a target opening and an actual opening by using a control gain including the corrected proportional gain, and PWM driving means for inputting an operation amount to a motor that is output from the throttle opening feedback control means and outputting a voltage that is in proportion to the operation amount to the motor.

According to the engine control apparatus according to the present invention, by correcting the proportional gain value for controlling the throttle opening feedback in the idle stop/start period to the value that is larger than the proportional gain value outside the idle stop/start period, the throttle operation response delay time during the engine restart can be reduced, and thus the throttle opening can be rapidly set to the throttle opening position in which the pumping loss during the engine restart is small. Accordingly, since the load torque and the power consumption of the starter motor during the engine cranking are reduced, the engine restart time is shortened and the starter motor or the battery is miniaturized.

The foregoing and other objects, features, aspects, and advantages of the present invention will become more apparent from the following detailed description of the present invention when taken in conjunction with the accompanying drawings.

BRIEF DESCRIPTION OF THE DRAWINGS

FIG. 2 is a diagram illustrating the relationship between the opening deviation and the control gain setting value in an engine control apparatus according to embodiment 1 of the invention;

FIG. 3 is a flowchart illustrating a throttle control process of an engine control apparatus according to embodiment 1 of the invention;

FIGS. 4A to 4C is a diagram illustrating the operation characteristic of a throttle valve, in which FIG. 4A illustrates a throttle valve operation in the case of control gain adapting at low temperature, FIG. 4B illustrates a throttle valve operation in the case of control gain adapting at high temperature, and FIG. 4C illustrates a throttle valve operation in the case of correcting a proportional gain at high temperature;

FIG. 6 is a timing chart illustrating the relationship between a throttle valve operation during start and start time in the case where a proportional gain is corrected in an ISS period in an engine control apparatus according to embodiment 1 of the invention.

DETAILED DESCRIPTION OF THE INVENTION

Embodiment 1

Hereinafter, an engine control apparatus according to embodiment 1 of the invention will be described with reference to the accompanying drawings.

Figure 1:
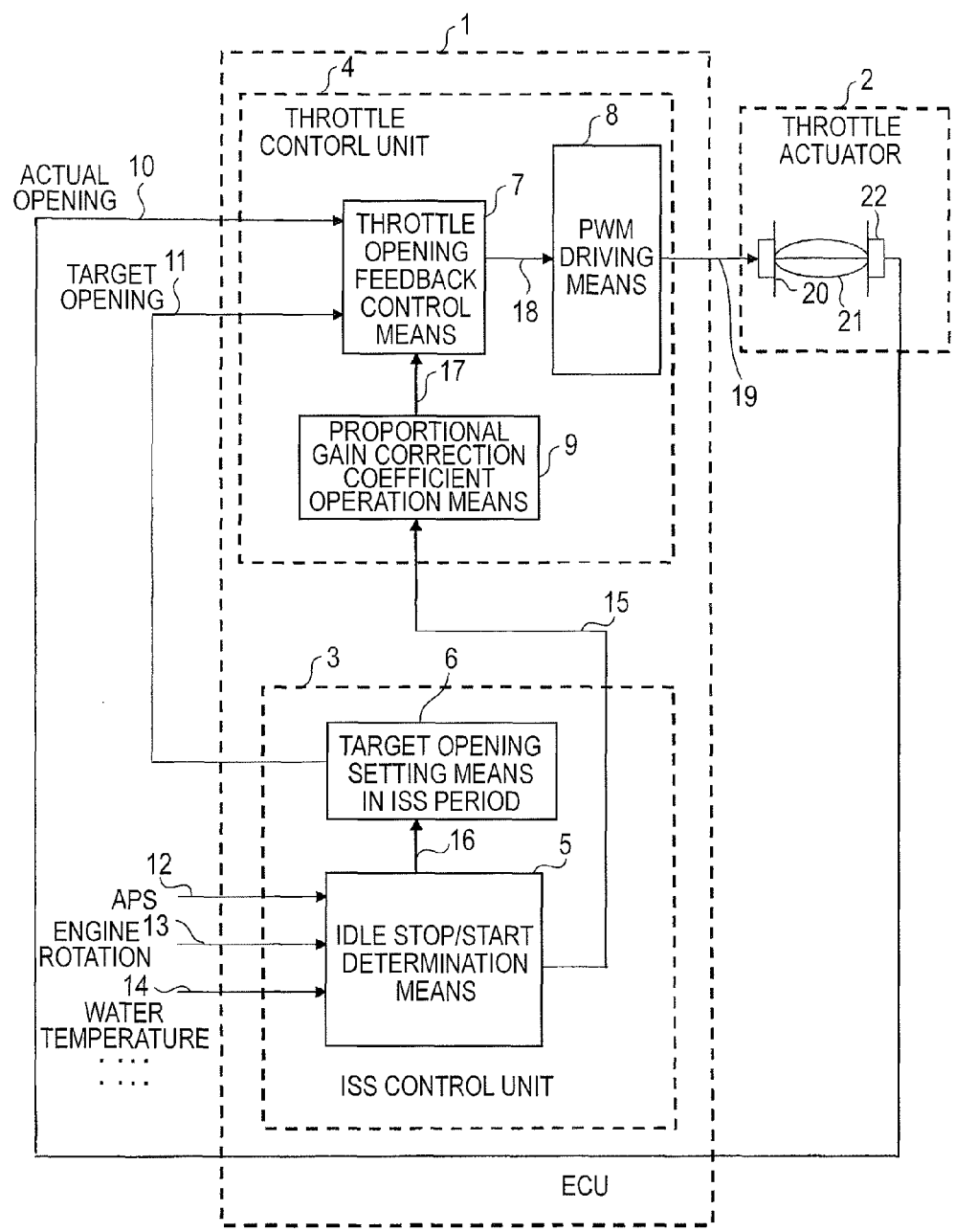
FIG. 1 is a diagram illustrating a brief configuration of an engine control apparatus according to embodiment 1 of the invention.

FIG. 1 is a diagram illustrating a brief configuration of an engine control apparatus according to embodiment 1 of the invention, which shows an ISS control unit and a throttle control unit of the control apparatus provided with a control unit (ECU) 1 of an engine (not illustrated) and a throttle actuator 2.

In FIG. 1, the engine control unit (ECU) 1 is provided with an idle stop/start (hereinafter also referred to as "ISS") control unit 3 and a throttle control unit 4.

The ISS control unit 3 is provided with idle stop/start determination means 5 for inputting a vehicle speed (not illustrated) signal, a brake switch (not illustrated) signal, an accelerator position sensor (APS) signal 12, an engine rotation signal 13, an engine cooling water temperature (engine water temperature) signal 14, and the like, and performing determination of the idle stop/start, and target opening setting means 6 in an ISS period for setting a throttle target opening in the idle stop period according to a throttle target opening setting mode signal 16 that is output by the idle stop/start determination means 5.

The idle stop/start determination means 5 outputs a flag 15 in the ISS period for correcting a proportional gain for throttle opening feedback control operation in the ISS period to a value that is larger than the proportional gain outside the ISS period.

Also, if the idle stop is determined by the idle stop/start determination means 5, a driving signal of an injector (not illustrated) that performs fuel supply to an engine combustion chamber is cut off, and a driving signal of an ignitor (not illustrated) for igniting a gaseous mixture that is composed of fuel and air in the combustion chamber through an ignition plug (not illustrated) is cut off.

The throttle control unit 4 includes proportional gain correction coefficient operation means 9 for operating a proportional gain correction coefficient Gc that corrects the proportional gain according to the flag 15 in the ISS period that is output from the idle stop/start determination means 5, throttle opening feedback control means 7 for inputting the proportional gain correction coefficient (Gc) 17 output by the proportional gain correction coefficient operation means 9, a throttle target opening 11 in the ISS period that is set by the target opening setting means 6 in the ISS period of the ISS control unit 3, and an actual opening 10 that is detected by a throttle position sensor (TPS) 22, and performing a throttle opening feedback (F/B) control operation by using a known PID control operation based on an opening deviation between the target opening 11 and the actual opening 10 to calculate a duty value 18 for controlling a motor voltage, and PWM driving means 8 for inputting the duty value 18 and outputting a motor control voltage 19 that is controlled through PWM driving.

The throttle actuator 2 is configured in a manner that a DC motor 20 is driven by the motor control voltage 19 output from the PWM driving means 8, the driving force of the DC motor 20 is transferred to a throttle valve 21 through a speed reducer (not illustrated), and the actual opening 10 is detected by the throttle position sensor (TPS) 22 that is installed on a throttle valve axis.

Next, the operation thereof will be described.

FIG. 3 is a flowchart illustrating a throttle control process of an internal-combustion engine.

The throttle control unit 4 performs the following process for every predetermined control period (for example, 2.5 ms).

In step S1, the idle stop/start (ISS) control process (the details of the process will be described later) is performed, and in an idle stop/start period (a period from an automatic engine stop time to the time when the engine reaches a predetermined number of rotations through the engine restart), the flag in the ISS period is set, while outside the idle stop/start period, the flag is cleared.

In step S2, in the case where the flag in the ISS period is set, the processing proceeds to step S3 for performing a throttle opening F/B control operation by seemingly increasing the proportional gain for the PID control operation to be described later through the proportional gain correction coefficient Gc.

In step S3, in order to set the correction coefficient Gc for correcting the proportional gain to a second specified value Gc2, the correction coefficient Gc(n) of the proportional gain for the PID control operation in this coming control period is set to the second specified value Gc2 (for example, 1.5) that is larger than a first specified value Gc1 (in this case, 1.0) (that is, Gc(n)=Gc2) to proceed to step S7.

Accordingly, the throttle control is transferred from a period outside the ISS period to the ISS period, and the proportional gain for the PID control operation is rapidly changed to a gain value that is larger than the set value outside the ISS period (for example, 1.5 times) to reduce the throttle operation response delay.

If the flag in the ISS period is cleared in step S2, it is determined, in step S4, whether the correction coefficient Gc (n−1) of the proportional gain in the previous control period coincides with the first specified value Gc1. If the correction coefficient Gc (n−1) does not coincide with the first specified value Gc1, the correction coefficient Gc(n) of the proportional gain in this coming control period is calculated and set to the correction coefficient of the proportional gain in the previous control period Gc(n−1)+(first correction coefficient Gc1−second correction coefficient Gc2)/correction coefficient update constant Cr (for example, 32) in step S5, and the processing proceeds to step S7.

Accordingly, in the case where the throttle control is transferred from the ISS period to the period outside the ISS period, the proportional gain for the PID control operation is gradually corrected to the set value outside the ISS period, and thus the correction of the proportional gain at an unnecessary speed is prevented to secure the control stability.

In step S4, in the case where the correction coefficient Gc (n−1) of the proportional gain in the previous control period coincides with the first specified value Gc1, the correction coefficient Gc (n) of the proportional gain in the this coming control period is set to the first specified value Gc1 (that is, Gc(n)=Gc1) in step S6, and the processing proceeds to step S7.

In step S7, the output voltage value of the throttle position sensor (TPS) 22 that outputs a voltage that is in proportion to the actual opening position of the throttle valve 21 is A/D-converted and read as the actual opening 10.

In step S8, the engine control unit reads any one of a target opening value, which is calculated as a target opening value during a typical engine operation (outside the ISS period) by using a preset target opening setting map based on the output value of the accelerator position sensor (APS) 12 that outputs a voltage in proportion to the accelerator pedal depression amount after the engine start and engine operation information, such as an engine rotating speed 13, an engine water temperature 14, and the like, and a target opening value in the ISS period, in which any one of a default opening position that is mechanically positioned by a motor conduction interception of the throttle actuator during the engine stop in the ISS period and a throttle opening position, in which the inhalation resistance (pumping loss) during the engine cranking according to an engine restart command is low, is set, as a target opening 11.

Next, in step S9, the throttle opening F/B control means 7 performs the PID control operation process based on the target opening 11 and the actual opening 10 which are sampled in each control period.

First, an absolute value of the opening deviation (=target opening 11−actual opening 10) (n) is obtained from the target opening 11(n) and the actual opening 10(n) which are sampled at this coming sampling timing n. Then, the PID control gain (a proportional gain KP(i), an integral gain KI(i), and a differential gain KD(i)) according to the opening deviation (i) is read by a PID control gain map as illustrated in FIG. 2 that is preset based on the absolute value ERROR(i) of the opening deviation. Then, a proportional (P) term is calculated by multiplying the proportional gain KP(i), the proportional gain correction coefficient Gc(n) in this coming control period, and the opening deviation, an integral (I) term is calculated by multiplying the integral gain KI and an integral value of the opening deviation, and a differential (D) term is calculated by multiplying the differential gain KD and an actual opening variance {the actual opening (n)−the actual opening (n−1)}.

Thereafter, a value calculated by an addition operation of the calculated proportional (P) term, integral (I) term, and differential (D) term is output and set as the duty value 18 in step S10.

Accordingly, the proportional gain KP is greatly corrected in the ISS period rather than in the period outside the ISS period even for the same opening deviation value, and thus a large duty value 18 is output.

Next, in step S11, the duty value 18 is input to the PWM driving means 8. The PWM driving means 8 sets the PWM driving duty ratio to the above-described duty value, the voltage 19 that is in proportion to the duty value is supplied to the driving motor 20, and the F/B control is performed so that the actual opening 10 of the throttle valve 21 coincides with the target opening 11.

Figure 4A:
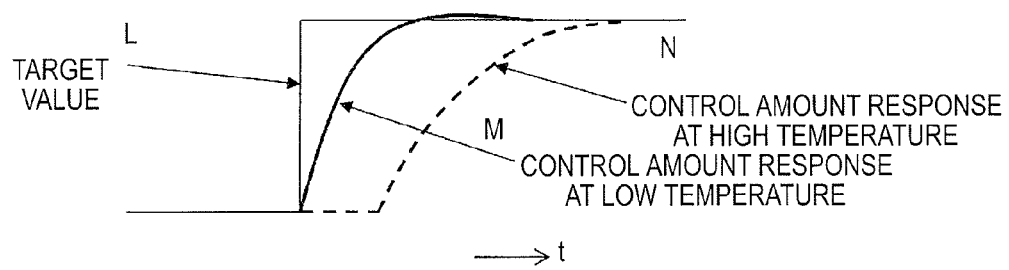
Figure 4B:
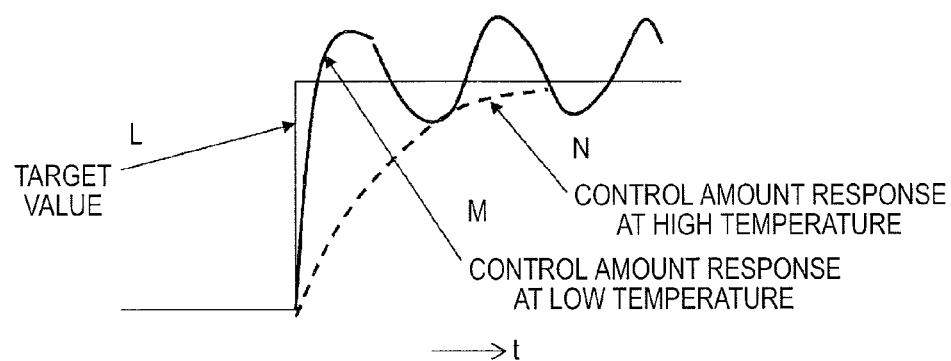
Figure 4C:
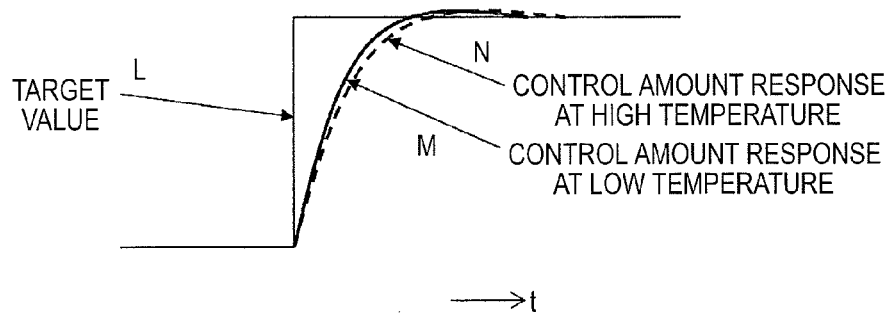

Through the above-described process, during the restart in the ISS period, the actual opening 10 is rapidly operated to the throttle opening position in which the pumping loss is low (see FIG. 4C), and thus the load torque of the starter motor during the cranking is reduced and by that much shortens the start time (see FIG. 6).

Figure 5A:
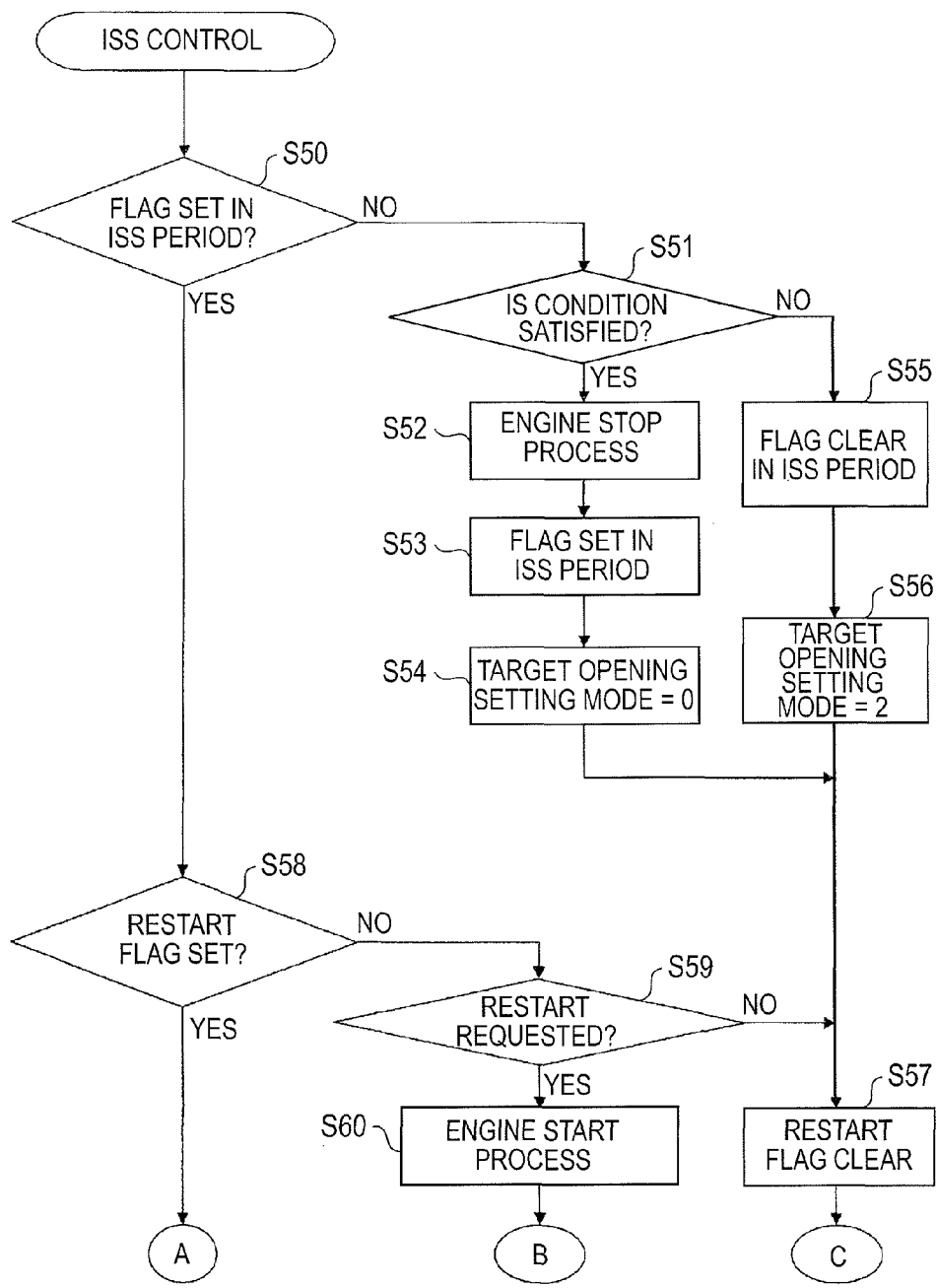
FIG. 5A is a flowchart illustrating an ISS control process in an engine control apparatus according to embodiment 1 of the invention.
Figure 5B:
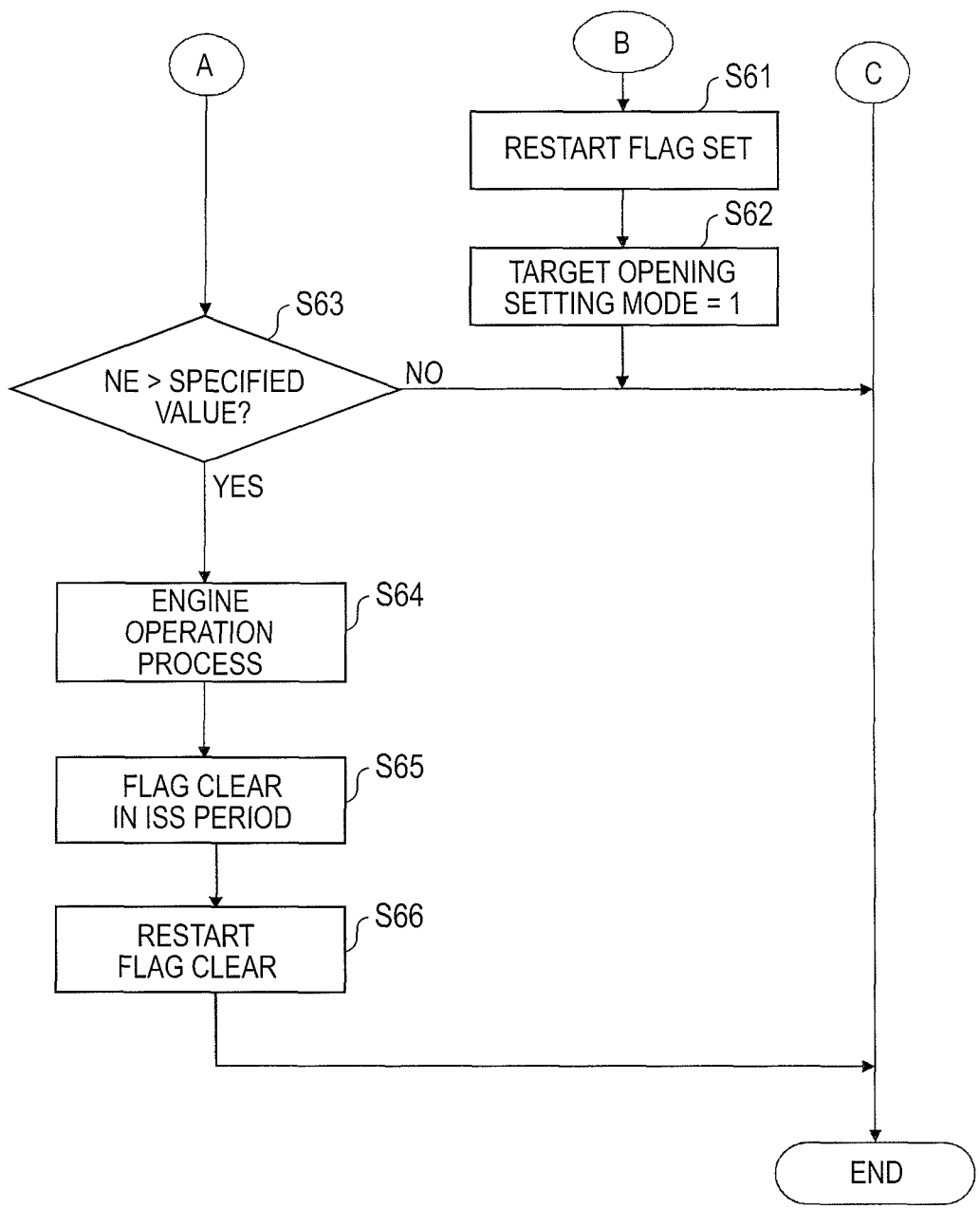
FIG. 5B is a flowchart illustrating an ISS control process in an engine control apparatus according to embodiment 1 of the invention.

FIGS. 5A and 5B illustrate a brief flow of the idle stop/start (ISS) control process.

First, in step S50, it is determined whether or not the idle stop/start control is being executed through determination of whether or not the flag is set in the ISS period (step S50).

If the flag is not set, in step S51, it is determined whether an idle stop (IS) condition (for example, the engine water temperature is equal to or higher than 60° C., the vehicle speed is "0", and the brake switch SW is in an ON state) is satisfied. If the IS condition is satisfied, in step S52, an engine stop process (for example, fuel cut through cutoff of a driving signal to an injector (not illustrated), ignition cutoff by turning off an ignition signal to an ignitor (not illustrated), cutoff the conduction of the throttle motor, and the like) is performed, and in step S53, the flag in the ISS period is set. In step S54, the target opening setting mode is set to "0", and the default opening position in which the throttle valve is mechanically positioned in an intermediate opening position through a return spring (not illustrated) force during the motor conduction cutoff is set as the target opening 11.

Then, in step S57, the restart flag is cleared to finish the process.

If the IS condition is not satisfied in step S51, the flag in the ISS period is cleared in step S55, and the target opening setting mode is set to "2" in step S56. At the same time, the target opening during a typical engine operation is calculated using the throttle target opening map that is preset based on the engine operation information, such as the accelerator opening, the number of engine rotations, the water temperature, and the like, and is set as the target opening 11. Then, the process in step S57 is performed to finish the process.

If the flag in the ISS period is set in step S50, it is determined whether or not the engine restart process is being executed through determination of whether or not the restart flag is set in step S58. If the restart flag is not set, the existence/nonexistence of a restart request is determined through determination of whether the brake switch is in an on/off state in step S59. If the brake switch is in an on state and there is no restart request, the process in step S57 is performed to finish the process.

If the brake switch is in an off state and there is an engine restart request, the engine start process (for example, the engine crank shaft is rotated by driving the starter motor, and the throttle valve is F/B-controlled to the opening position in which the pumping loss is low) is performed in step S60, the restart flag is set in step S61, and the target opening setting mode is set to "1" in step S62. At the same time, the throttle opening position (for example, completely open position), in which the starter motor load torque is lowered during the engine cranking by the starter motor and the pumping loss is low, is set as the target opening 11 and the process is finished.

If the restart flag is set in step S58, it is determined whether or not the engine rotating speed Ne reaches a specified value (for example, 200 rpm) in step S63.

If the rotating speed Ne is equal to or smaller than a specified value, the process is finished as it is, while if the rotating speed Ne is larger than the specified value, the engine operation process (for example, fuel injection control, ignition time control, and the like) is performed in step S64, the flag in the ISS period is cleared in step S65, the restart flag is cleared in step S66, and the process in the ISS period is finished.

Figure 7:
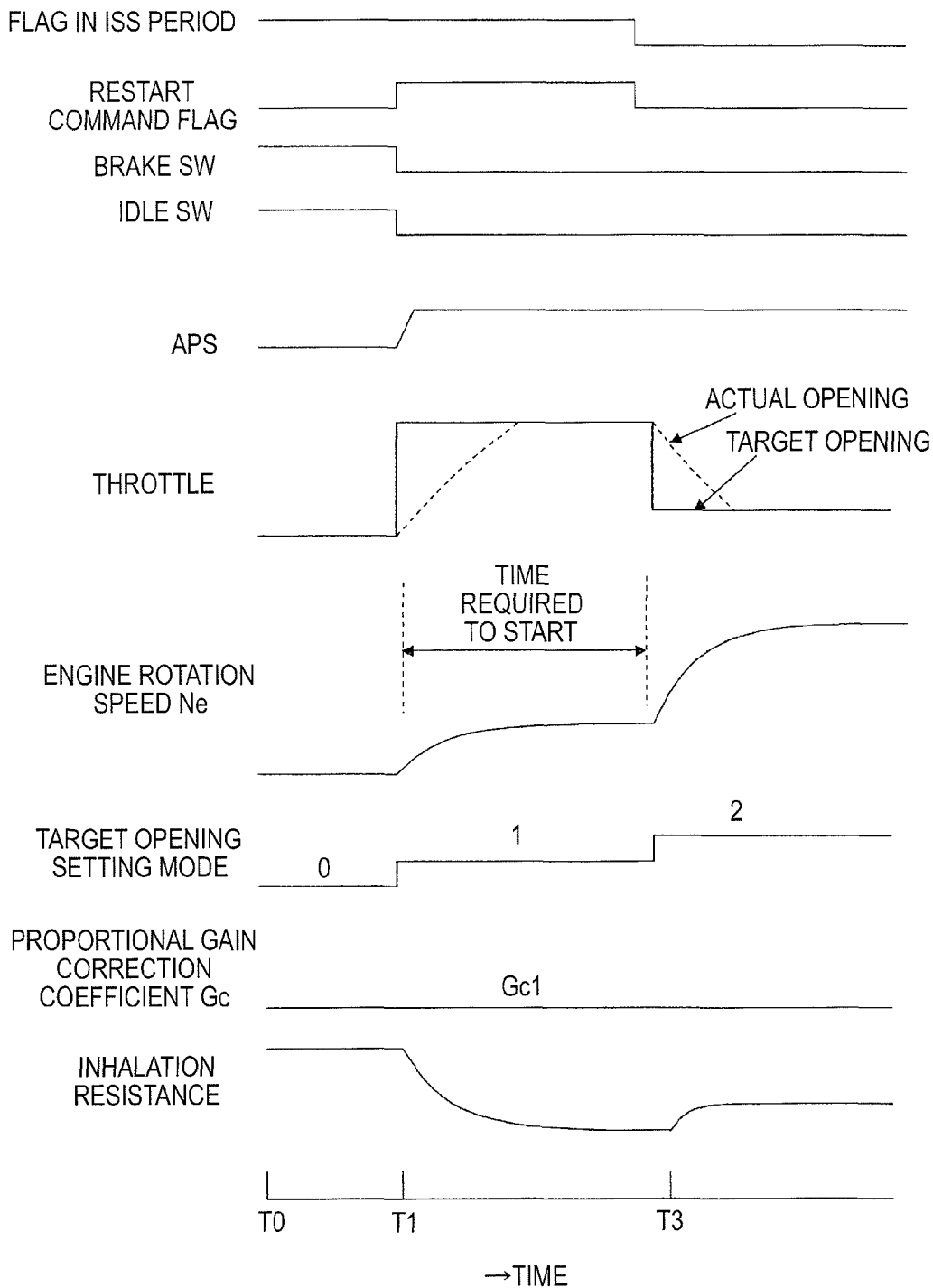
FIG. 7 is a timing chart illustrating the relationship between a throttle valve operation during start and start time in the case where a proportional gain is not corrected in an ISS period in an engine control apparatus according to embodiment 1 of the invention.

FIGS. 6 and 7 are time charts illustrating the relationship between the throttle response operation during the engine restart and time required for the engine restart in the case where the proportional gain KP that is used for the throttle opening F/B control operation in the ISS period is corrected to a value that is larger than the proportional gain outside the ISS period (see FIG. 6) and in the case where the proportional gain KP is not corrected (see FIG. 7).

If a foot is taken off from the brake pedal at time T1 in a state where the flag in the ISS period is set and the engine is stopped (engine rotating speed=0) at time T0 of FIGS. 6 and 7, the brake switch (brake SW) becomes in an off state, and the engine restart command flag is set. Meanwhile, if the accelerator pedal is pressed, the accelerator opening (APS) signal is increased to turn off the idle switch (idle SW) signal, and the throttle target opening during the engine restart is set from the default opening position (target opening setting mode=0) during the motor conduction cutoff to the completely open throttle position (target opening setting mode=1) in which the inhalation resistance (pumping loss) is low. Also, if the cranking starts by the starter motor (not illustrated), the engine rotating speed Ne starts increasing, and if the engine rotating speed Ne reaches the specified number of rotations (in this case, 200 rpm) at time T2 (FIG. 6) and time T3 (FIG. 7), a typical engine operation process is performed. By this, the flag in the ISS period and the restart command flag are cleared, and the throttle target opening is set to the target opening position (target opening setting mode=2) during the typical operation that is set based on the engine operation state input information, such as the accelerator opening, the engine rotating speed, water temperature, and the like.

In FIG. 7, in the same manner as in FIG. 6, by correcting the proportional gain KP that is used for the throttle opening F/B control operation in the ISS period to the value that is larger than the proportional gain outside the ISS period (the proportional gain correction coefficient Gc=Gc2), the throttle operation response during the engine restart becomes rapid, and the throttle valve can rapidly reach the throttle opening position in which the pumping loss is small. Because of this, the pumping loss during the driving of the starter motor is rapidly lowered to increase the rising speed of the engine rotation, and thus the engine restart time (T2-T1 in FIGS. 6, and T3-T1 in FIG. 7) can be shortened.

As described above, according to the engine control apparatus according to embodiment 1 of the invention, by correcting the proportional gain KP that is used for the throttle opening F/B control operation in the ISS period to the value that is larger than the proportional gain outside the ISS period, the throttle operation response during the engine restart becomes rapid, and the pumping loss during the driving of the starter motor is rapidly lowered to increase the rising speed of the engine rotation. As a result, the engine restart time can be shortened, and the driving force of the starter motor can be small to obtain the miniaturization of the starter motor.

Various modifications and alterations of this invention will be apparent to those skilled in the art without departing from the scope and spirit of this invention, and it should be understood that this is not limited to the illustrative embodiments set forth herein.

What is claimed is:

1. An engine control apparatus including a throttle actuator driving opening/closing of a throttle valve; throttle opening detection means for detecting an actual opening of the throttle valve; and control means for controlling feedback of the throttle actuator by using a predetermined control gain so that the actual opening of the throttle valve that is detected by the throttle opening detection means becomes a target opening, wherein the control means comprises:

an idle stop/start control unit provided with idle stop/start determination means for inputting at least an engine cooling water temperature, vehicle speed, and brake information and determining execution of idle stop/start, and target opening setting means for setting a target opening in an idle stop/start control period; and a throttle control unit provided with proportional gain correction coefficient operation means for correcting a proportional gain that is used in a throttle opening feedback control operation to a value that is larger than a proportional gain outside the idle stop/start control period in an engine idle stop/start control period that is determined by the idle stop/start determination means, throttle opening feedback control means for performing a throttle opening feedback control operation based on an opening deviation between a target opening and an actual opening by using a control gain including the corrected proportional gain, and PWM driving means for inputting an operation amount to a motor that is output from the throttle opening feedback control means and outputting a voltage that is in proportion to the operation amount to the motor.

2. The engine control apparatus according to claim 1, wherein the throttle opening feedback control means obtains an absolute value of the opening deviation (the target opening−the actual opening) (n) from the target opening (n) and the actual opening (n) sampled at this coming sampling timing (n), and reads the PID control gain (the proportional gain KP(i), an integral gain KI(i), and a differential gain KD(i)) according to the opening deviation (i) by a preset PID control gain map based on the absolute value of the opening deviation; and the throttle opening feedback control means calculates a proportional (P) term by multiplying the proportional gain KP(i), the proportional gain correction coefficient Gc in this coming control period that is calculated by the proportional gain correction coefficient operation means, and the opening deviation, calculates an integral (I) term by multiplying the integral gain KI and an integral value of the opening deviation, calculates a differential (D) term by multiplying the differential gain KD and an actual opening variance {the actual opening (n)−the actual opening (n−1)}, and performs the throttle opening feedback (F/B) control operation through addition of the calculated terms.

\* \* \* \* \*